United States Patent [19]

Richard

[11] 4,283,018
[45] Aug. 11, 1981

[54] SHREDDING ACCESSORY FOR ROTARY LAWN MOWER

[76] Inventor: Alyre J. Richard, 521 Knox St., Rumford, Me. 04276

[21] Appl. No.: 97,436

[22] Filed: Nov. 26, 1979

[51] Int. Cl.³ .............................................. B02C 18/22
[52] U.S. Cl. ............................. 241/101.1; 241/101.3; 241/101.7
[58] Field of Search ............... 56/17.3, 17.4, 17.5, 56/16.9, 503, 3.3, 13.4; 241/101.1, 101.2, 101.3, 101.7, 277, 282.1, 282.2, 37.5

[56] References Cited

U.S. PATENT DOCUMENTS

| 3,412,770 | 11/1968 | Johnson | 241/101.7 X |
| 3,716,090 | 2/1973 | Lautzenheiser | 241/101.7 |
| 3,808,782 | 5/1974 | McWilliams | 241/101.1 X |
| 4,057,952 | 11/1977 | Brokaw | 241/101.7 X |
| 4,169,561 | 10/1979 | Saxton | 241/101.1 |

OTHER PUBLICATIONS

Kennedy, R. S. et al., *Make a Mulcher for your Mower*, Popular Science, p. 178, Oct. 1978.

Primary Examiner—Mark Rosenbaum
Attorney, Agent, or Firm—William Nitkin

[57] ABSTRACT

A shredding accessory for a rotary lawn mower having dual entry doors in a hopper and a window for observation of such shredding. An optional base plate with side walls may be utilized therewith. The lawnmower may still be utilized without this invention in a conventional manner.

3 Claims, 3 Drawing Figures

SHREDDING ACCESSORY FOR ROTARY LAWN MOWER

BACKGROUND OF THE INVENTION

1. Field of the Invention

This invention relates to home garden shredding equipment and more particularly to an apparatus for utilization with a rotary type lawn mower for the shredding and mulching of organic matter such as leaves, grass and the like.

2. History of the Prior Art

A study of the prior art discloses many devices to be used in garden settings for the shredding and mulching of leaves and other organic matter. Many of such devices adapt mowing devices for a variety of other uses such as shredding and mulching.

Patents reviewed have disclosed several rotary lawn mower devices which have means for receiving from a hopper the organic matter to be shredded. U.S. Pat. No. 4,057,952 by Brokaw discloses a typical structure of such a unit having a hopper disposed over the housing of a rotary lawn mower with means for entering the material to be shredded into the top of the hopper and an optional bottom cover for assistance in containing the organic matter within the mower housing as the matter is being shredded. Other units disclosing a similar hopper feeding organic matter into the housing of a rotary lawn mower are disclosed in U.S. Pat. Nos. 2,861,611 by Considder and 3,100,371 by Redmon. Other devices specifically designed for shredding also use hoppers for the entry of organic matter therein. Examples of such devices are illustrated by the disclosures in U.S. Pat. Nos. 3,861,603 by Lautzenheiser; 3,968,938 by Ruhl; 4,076,460 by Roof; and 3,539,930 by Lautzenheiser. Other patents also disclosing shredders are:

U.S. Pat. No. 3,808,782 by McWilliams
U.S. Pat. No. 3,049,857 by Shaw
U.S. Pat. No. 3,963,184 by Grimm
U.S. Pat. No. 3,674,220 by Tupper
U.S. Pat. No. 3,527,278 by Johnson
U.S. Pat. No. 4,062,498 by Szepaniak
U.S. Pat. No. 3,908,913 by Cushman
U.S. Pat. No. 3,908,914 by Cushman
U.S. Pat. No. 4,118,917 by Leader
U.S. Pat. No. 3,716,090 by Lautzenheiser
U.S. Pat. No. 3,817,462 by Hamlin
U.S. Pat. No. 3,688,479 by Martinson
U.S. Pat. No. 3,531,923 by DeLay
U.S. Pat. No. 2,847,224 by Stout
U.S. Pat. No. 2,793,667 by Hall
U.S. Pat. No. 3,157,015 by Russell
U.S. Pat. No. 2,822,846 by Ward
U.S. Pat. No. 3,841,571 by Dankel et al Another such device is reviewed in the Popular Science Magazine article "Make A Mulcher For Your Mower", October 1978, on page 178.

SUMMARY OF THE INVENTION

My invention is an improved shredder and mulching device constructed to overcome some of the problems with the existing art. My device utilizes some of the structure basic to the prior art such as a bottom plate member and a hopper member entering into an aperture defined within the top of the housing of a rotary lawn mower. Further my hopper has other similarities with the prior art in that it extends back, forming a basin member. The improvements to my device are as follows. Firstly, I have incorporated a novel entry mechanism within the hopper to allow for greater safety to the user while entering organic matter to the shredding blade to first prevent the user's fingers or hands from being caught within the device, and secondly prevent throwback of the shredded material toward the user which action might cause injury. In this regard my hopper is equipped with a hopper entry door approximately 4 inches in length running the width of the hopper adapted for the entry of organic matter into the hopper member itself. The entry door is hinged on a pivot member and returnable to a closed position by a spring member so that after material has been entered, the door will close thereby closing the top of the unit, preventing any throwback of material. Adjacent to the hopper entry door is a window member which is located directly above the aperture within the upper housing of the rotary lawn mower into which the hopper member's engagement projection is engaged. One can then clearly view the shredding process in safety. Affixed to the adjacent wall and extending through a portion of the window member support area is tamper member which, in an inactive position is held by a tamper bracket and can be disengaged therefrom and lowered to an active position so as to enable the user to free matter stuck within the hopper itself or to reach into the housing to free stuck matter therein. It is important that the tamper bracket as described herein be provided so that the tamper can be locked in an up position out of the way of the entry of organic matter into the tamper. A larger basin entry door is provided also pivoting from the same pivot member as the hopper entry door which allows for the entry of larger amounts of organic matter such as brackets of leaves and the like which can be pushed through the door and which door will close after the matter has been entered therethrough. The basin entry door being hinged on the same pivot as the hopper entry door, is closed by the same spring member as the hopper entry door but towards the lower portion of the catch basin. These doors provide security for the user in that there can be no back-throwing of the material as it is being chopped. Further I have found as suggested in some of the prior art that a removable base plate can be affixed to the bottom of the rotary lawn mowr and such is provided herein. I have also found that the upwardly extending sides of the base plate should be in close proximity to the perimeter of the cutting blade and should be of sufficient height to contain the cutting blade. I have further found that a blade having projections extending therefrom as described further in the drawings and Description of the Preferred Embodiment(s) assists in the proper chopping of the organic matter entered into the unit.

Therefore it is an object of my invention to provide a more workable and safe shredder of simple and economical construction so that one can shred organic matter at home without the fears and the inherent danger involved with the use of high speed rotary mowers which could otherwise cause injuries or damage to person or property.

DESCRIPTION OF THE PREFERRED EMBODIMENT(S)

Figure 1:
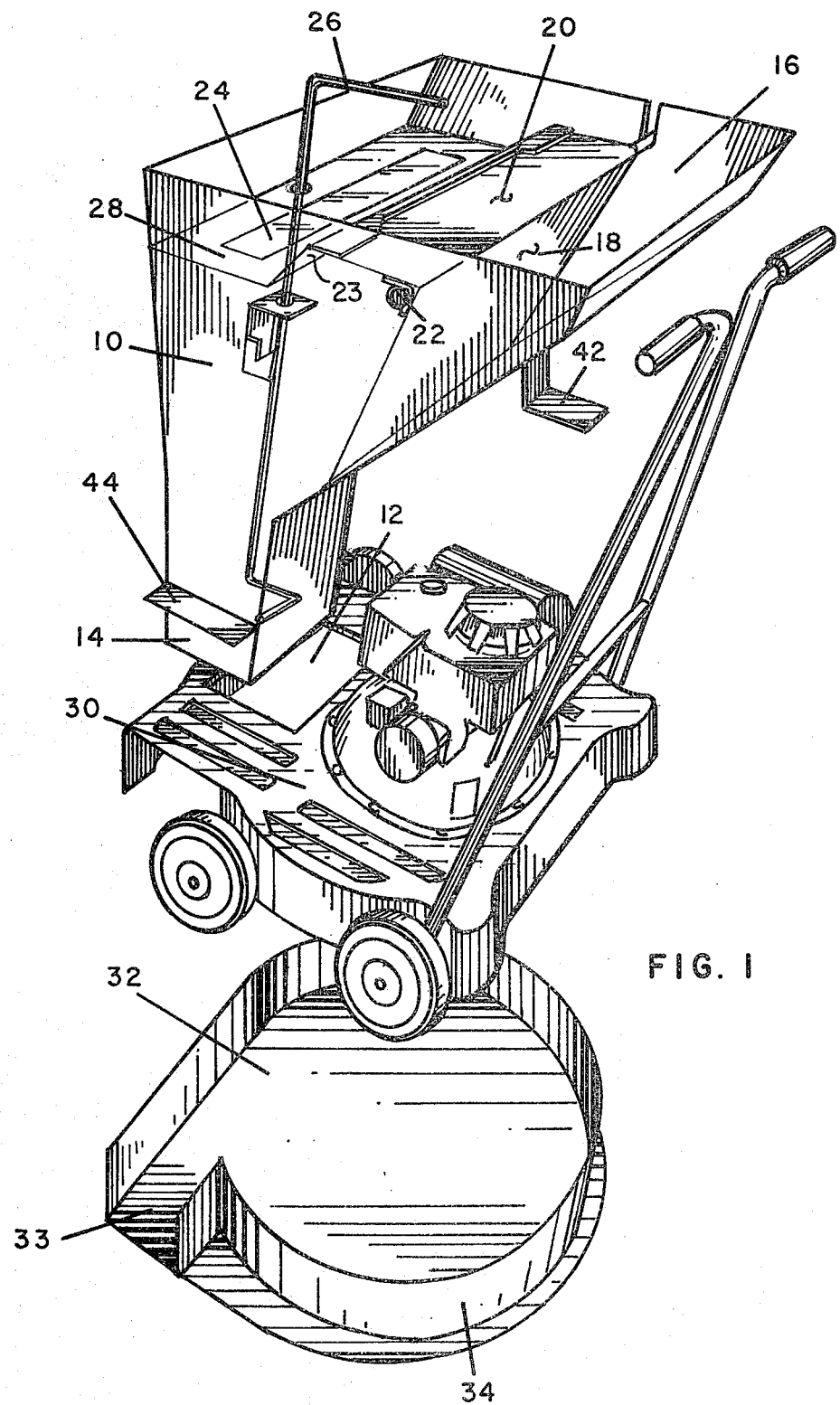
FIG. 1 illustrates a perspective view of the apparatus of this invention showing the hopper above the aperture within the rotary lawn mower in which it is to be mounted with the removable base plate illustrated therebelow.
Figure 2:
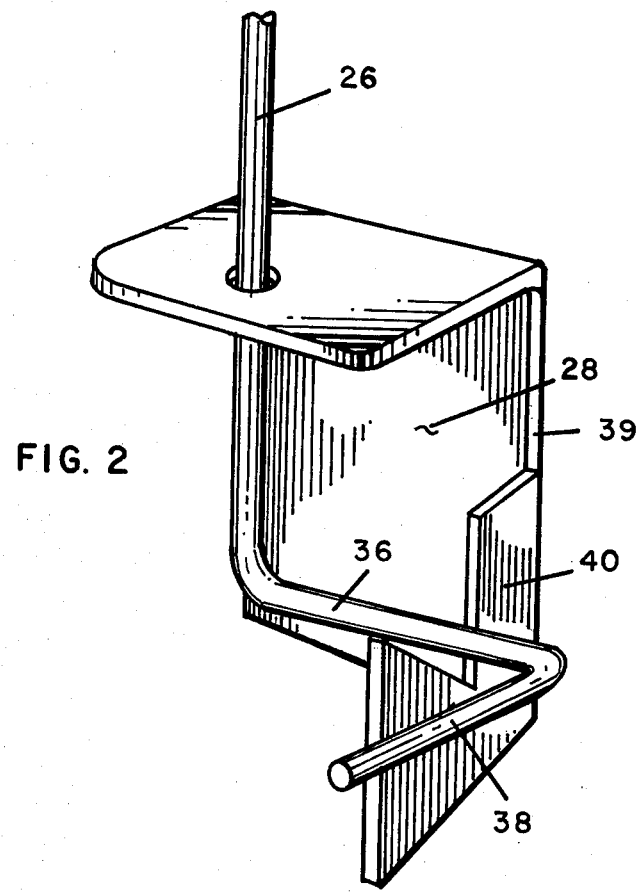
FIG. 2 illustrates a support bracket for the tamper.
Figure 3:
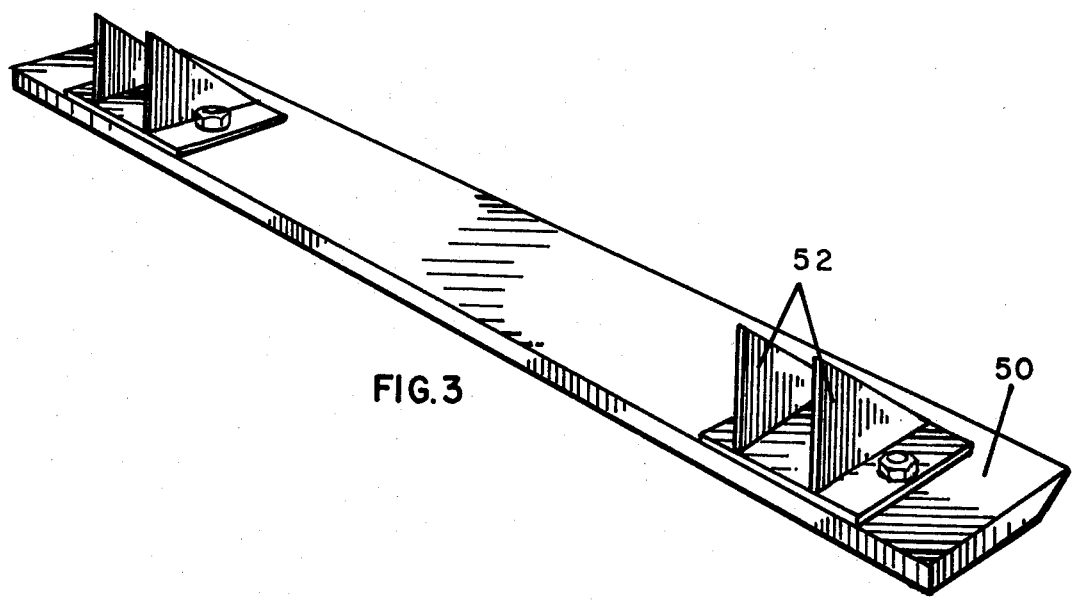
FIG. 3 illustrates the blade of the rotary lawn mower unit.

FIG. 1 illustrates a perspective view of the device showing a cutaway view of the hopper and removable base plate of the device of this invention. Seen in this view is hopper 10 adapted to be mounted into hopper aperture 12 within the lawn mower housing 30. A housing engagement projection 14 extends into the lawn mower housing so that organic matter is disposed, when entering therein, directly above blade 50. The hopper extends upwards and has a rearwardly extending unit referred to as catch basin 16. Disposed above the hopper aperture 12 is a window 24 which can be constructed of unbreakable glass or plastic which will allow for the viewing of the hopper aperture and give the user some idea of what is occurring within the device as shredding is taking place without the danger of flying particles striking him. Affixed to the front side within the hopper is tamper 26 which can be utilized to free stuck material. The tamper 26 can have a handle at the top thereof and at the base and has a portion 36 extending at an angle to the tamper 26 with an outwardly extending member 38 which are both adapted to be hooked into tamper bracket 39 disposed on a ledge protrusion 40 with a section cut out therefrom adapted for engaging portion 36 of the tamper. Window 24 joins to an upwardly extending plate 23 which plate abuts the hopper entry door 20 which pivots downward on pivot 22 and which is spring-loaded so as to always be urged into a closed position as illustrated. Such organic matter can be entered through hopper entry door 20. Larger items can be entered into catch basin 16 and be passed through basin entry door 18 which also pivots on the same pivot member 22 as hopper entry door 20 except it moves inward as shown by the direction of the arrow. It has been found when using the device of this invention that a blade 50 having a pair of triangular projections 52 mounted at each end thereof assists in the thorough chopping of materials and helps to prevent clogging of the unit. Optionally, below the unit a removable base plate 32 can be utilized adapted to be engaged onto the bottom of the lawn mower with upwardly extending sides 34 forming a close fitting circle around the blade itself so as to keep the material as close to the blade as possible while organic matter is being shredded with an exit chute 33 being provided for the escape of materials once they are shredded. It has been found that this bottom plate helps to improve the efficiency of the unit.

Although the present invention has been described with reference to particular embodiments, it will be apparent to those skilled in the art that variations and modifications can be substituted therefor without departing from the principles and spirit of the invention.

I claim:

1. An improved shredder for a rotary type lawn mower of the type having an open-topped hopper with an elongated basin and a lower portion entering into an aperture defined in the top of the lawn mower housing, wherein the improvements comprise:

a pivot member extending across the opening of said hopper;

a hopper entry door mounted within the top opening of said hopper rotatably affixed to said pivot member and adapted for the entry of materials into said hopper;

a basin entry door also mounted on said pivot adapted to swing inwardly to allow entry of materials from said elongated basin of said hopper;

a window unit disposed in said open-topped hopper allowing safe viewing of the progress of the shredding;

said hopper entry door and basin entry door when closed along with said window unit adapted to close the top of said hopper;

a tamper member adapted to move up and down within said hopper and within the mower housing; and a tamper bracket member adapted to support said tamper when lifted in an upward inactive position.

2. The apparatus of claim 1 further including a blade member utilized within said rotary lawn mower having a pair of triangular projections on each side thereof, extending perpendicularly to the plane of said blade.

3. The apparatus of claim 2 further including a base plate adapted for containment of the materials within the unit, said base plate having sidewalls extending upwards a distance to the uppermost portion of said blade and surrounding said blade in a close relationship.

* * * * *